United States Patent
Uchida et al.

(10) Patent No.: US 6,442,794 B2
(45) Date of Patent: Sep. 3, 2002

(54) GROMMET

(75) Inventors: Yoshimi Uchida, Yokkaichi; Shigeru Akoshima, Aichi; Yasuhiro Kasahara, Kariya, all of (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/783,094

(22) Filed: Feb. 15, 2001

(30) Foreign Application Priority Data

Feb. 16, 2000 (JP) ........................................ 2000-038640

(51) Int. Cl.$^7$ ................................................. F16L 5/00
(52) U.S. Cl. .................... 16/2.1; 16/2.2; 174/152 G; 174/153 G; 248/56
(58) Field of Search ................ 16/2.1, 2.2; 174/152 R, 174/152 A, 153 A, 153 G, 65 R, 65 G, 152 G; 248/56

(56) References Cited

U.S. PATENT DOCUMENTS

| 5,499,823 A | * | 3/1996 | Fukui | ........................... 16/2.1 |
| 5,736,677 A | * | 4/1998 | Sato et al. | .................. 174/135 |
| 5,856,635 A | * | 1/1999 | Fujisawa et al. | ........ 174/153 G |
| 5,981,877 A | | 11/1999 | Sakata et al. | |
| 6,240,597 B1 | * | 6/2001 | Mochizuki | .................... 16/2.1 |

FOREIGN PATENT DOCUMENTS

| JP | 3049904 | 4/1998 |
| JP | 11150837 | 6/1999 |

OTHER PUBLICATIONS

English Language Abstract of JP 11–150837.
English Language Abstract of JP 3049904.

* cited by examiner

Primary Examiner—Chuck Y. Mah
(74) Attorney, Agent, or Firm—Greenblum & Bernstein, P.L.C.

(57) ABSTRACT

A grommet for a wire harness is provided that includes a small-diameter portion into which a wire harness is insertable and which is tightly contactable with the wire harness, a large-diameter portion having an engaging groove engageable with an inner peripheral edge of an automobile body panel, an extending portion extending past an end of the small-diameter portion along an axial direction thereof, and a lip portion radially projecting from an outer peripheral surface of the extending portion. The lip portion tightly contacts an inner peripheral surface of the insertion hole from inside when the grommet is mounted. The lip portion has a step portion including a first face and a second face respectively engageable with the inner peripheral surface and an outer surface adjacent to a peripheral edge of the insertion hole. Thus, the tightness of the seal between the grommet and a sound insulator secured on the automobile body panel is improved.

6 Claims, 5 Drawing Sheets

GROMMET

BACKGROUND OF THE INVENTION

1. Field of Invention

This invention relates to a grommet mounted to an automobile body panel of an automobile. In particular, this invention improves tightness between the grommet and a sound insulator secured to the automobile body panel.

2. Description of Related Art

A sound insulator to prevent a noise is secured to an automobile body panel that divides an engine compartment and a passenger compartment of an automobile. A wire harness extending between the engine compartment and the passenger compartment is mounted through a through hole in the automobile body panel and through an insertion hole into the sound insulator. When the wire harness is mounted, in order to ensure waterproofness and soundproofness between the engine compartment and the passenger compartment, a grommet disclosed in the Japanese Laid-Open Patent Publication No. 11-150837 is used, for example.

As shown in FIG. 5(A), the grommet 1 is provided with a small-diameter portion 2, in which the wire harness W/H is inserted, a large-diameter portion 3 having an engaging groove 3a to engage with a through hole Pa in an automobile body panel P, a seal member holding portion 4, in which seal member M can be filled, and a lip portion 5 that tightly contacts the area surrounding a peripheral edge of an insertion hole Sa of a sound insulator S from the outside (right side in FIG. 5(A)). Since the lip portion 5 closes the insertion hole Sa, noise is prevented from intruding through an area where the sound insulator S does not exist. Further, since the lip portion 5 is spaced from the large-diameter portion 3 and is independent from the large-diameter portion 3, the lip portion 5 is easily elastically extensible. Accordingly, in the event that the grommet 1 is mounted in the through hole Pa, when the entire grommet 1 is pushed into the through hole Pa from the engine compartment side E toward the passenger compartment side R, the lip portion 5 having a large-diameter does not become an obstacle.

However, as shown in FIG. 5(B), due to a mounting route of the wire harness W/H, the wire harness W/H might be mounted in a condition in which the wire harness W/H is bent and inclines in one direction away from the axial direction of the grommet 1. In this condition, the small-diameter portion 2 and the seal member holding portion 4 also incline with the wire harness W/H, and thus, the lip portion 5 is pressed in the same direction, as well. As a result, since the lip portion 5 only contacts at the area surrounding the peripheral edge of the insertion hole Sa from the outside, the lip portion 5 at the side opposite to the direction in which the wire harness W/H inclines might become separated from the peripheral edge of the insertion hole Sa, and thus, a gap X might occur. The gap X might become a factor that deteriorates soundproofness of the assembly.

Accordingly, the present invention is provided in view of the above-described problem, and an objective of the present invention is to prevent the lip portion from separating from the area surrounding the insertion hole of the sound insulator, and to close the lip portion tightly, even if the wire harness inserted into the grommet inclines and is bent when mounted.

SUMMARY OF THE INVENTION

To achieve the above and/or other goals, the present invention provides a grommet configured to be mounted in tight contact with a through hole in an automobile body panel and an insertion hole in a sound insulator secured on a surface of the automobile body panel. The grommet includes a small-diameter portion into which a wire harness is insertable and that is tightly contactable with the wire harness, and a large-diameter portion that radially extends from an outer peripheral surface of the small-diameter portion intermediate a length in an axial direction of the small-diameter portion. An outer peripheral surface of the large-diameter portion has an engaging groove that is engageable with an inner peripheral edge of the through hole. The grommet further includes an extending portion that extends past an end of the small-diameter portion along the axial direction, and a lip portion radially projecting from an outer peripheral surface of the extending portion. The lip portion is tightly contactable with an inner peripheral surface of the insertion hole in the sound insulator from inside.

Preferably, the lip portion includes a step portion at the peripheral edge of the lip portion. The step portion is elastically tightly engageable with the inner peripheral surface and an end face adjacent to a peripheral edge of the insertion hole.

According to the construction described above, since the lip portion (or step portion thereof) projects in a direction toward the insertion hole of the sound insulator and the step portion is provided to elastically tightly contact the inner peripheral surface as well as the outer surface of the sound insulator, the desired result of tightly closing the insertion hole can be achieved. Accordingly, when the wire harness inserted into the grommet is bent in one direction and to have a curved portion mounted, and as a result, the small-diameter portion is also bent in the one direction and the grommet tends to become slightly separated from the outer surface adjacent to the insertion hole in the sound insulator, the grommet maintains the insertion hole tightly closed due to the engagement of the step portion with the inner peripheral surface.

It is possible that the extending portion includes a seal member holding portion having a diameter larger than a diameter of the small-diameter portion and is configured to receive a seal member in an interior thereof, and the lip portion projects from an outer peripheral surface of the seal member holding portion. According to this construction, the seal member inserted into the seal member holding portion can improve waterproofness of the wire harness. In addition, when the wire harness is bent, the seal member holding portion contacts the inner peripheral surface of the insertion hole of the sound insulator via the step portion of the lip portion. Accordingly, the wire harness can be prevented from being bent excessively.

Preferably, a length between the engaging groove of the large-diameter portion and the step portion of the lip portion is shorter than a thickness of the sound insulator. When the large-diameter cylindrical portion engages with the through hole, the lip portion is pressed toward the engaging groove and elastically contacts the outer surface adjacent to the peripheral edge of the insertion hole in the sound insulator. According to this construction, the lip portion is mounted in the insertion hole of the sound insulator in a condition that a tensile force is applied in a direction closing the insertion hole (i.e. toward the engaging groove). Thus, the effectiveness of the lip portion to close the insertion hole against bending of the wire harness can be improved.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
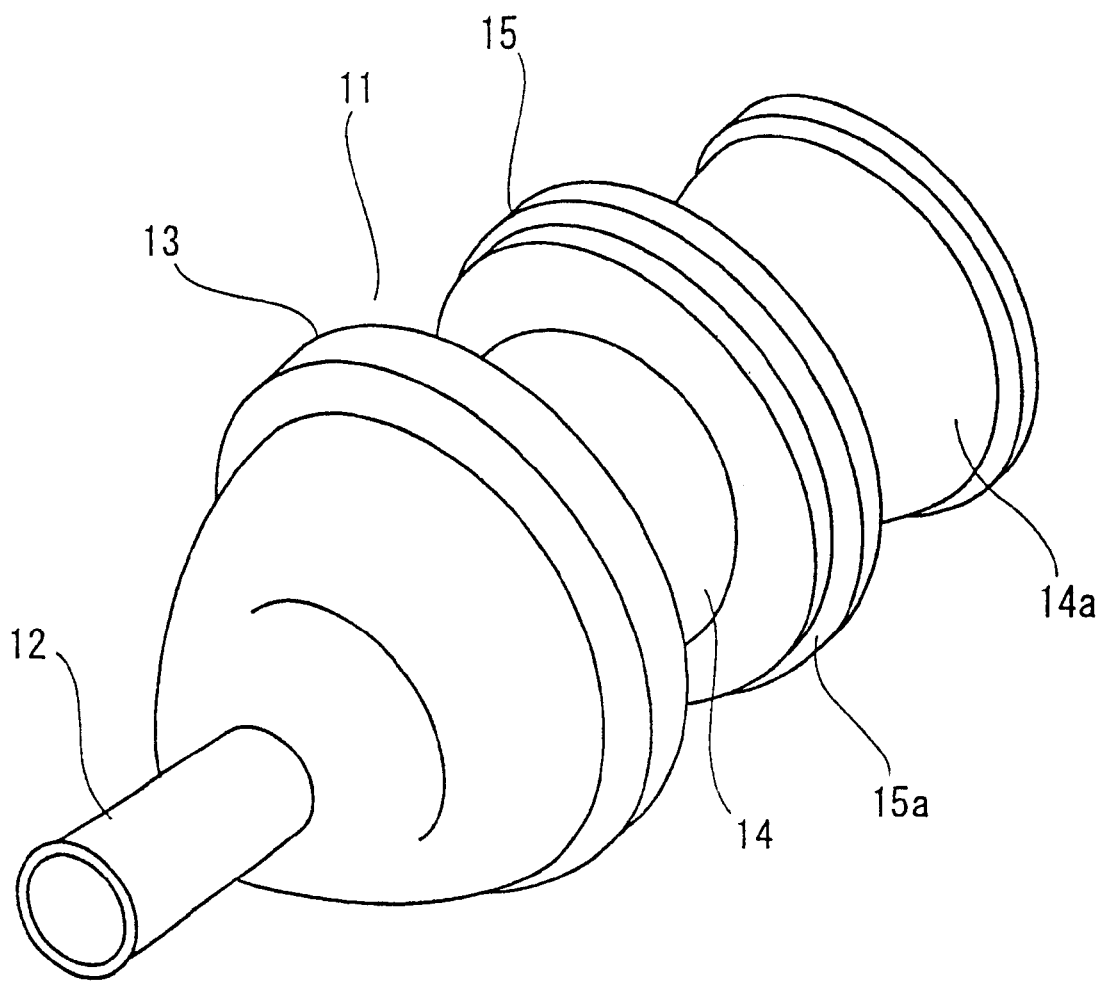
FIG. 1 is a perspective view illustrating a grommet according to an embodiment of the present invention.
Figure 2:
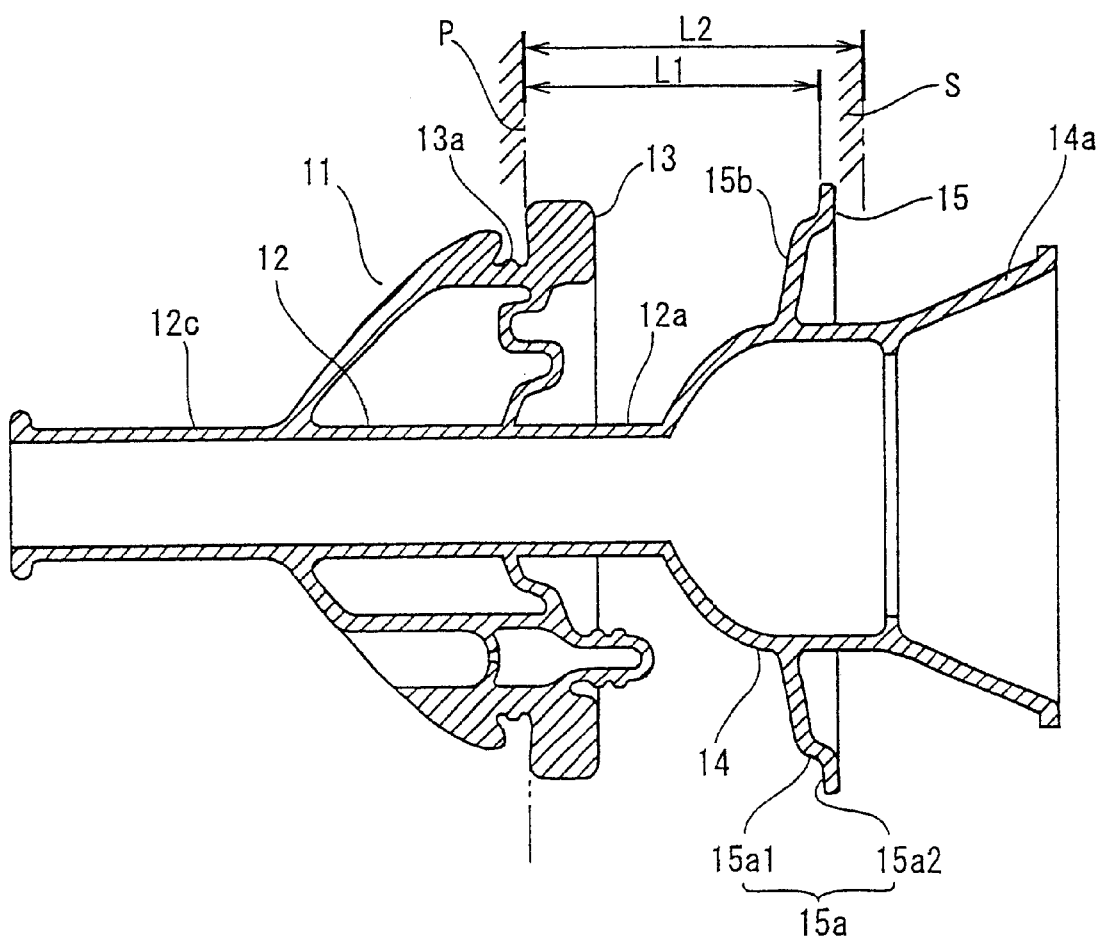
FIG. 2 is a cross-sectional view of the grommet according to the embodiment of the present invention.

Embodiments of the present invention are explained in the following with reference to figures. FIGS. 1–4(C) illustrate a grommet according to an embodiment of the present invention. The grommet 11 is made of a resilient material, such as a rubber or elastomer, and is provided with a small-diameter cylindrical portion 12, into which a wire harness W/H can be inserted and which tightly contacts the wire harness W/H. The grommet includes a large-diameter cylindrical portion 13 that engages with a through hole Pa provided in an automobile body panel P, and a lip portion 15 that can tightly contact an insertion hole Sa of a sound insulator S. The small-diameter cylindrical portion 12, the large-diameter cylindrical 13 and the lip portion 15 are sequentially arranged in this order in the axial direction of the grommet. In this embodiment, the sound insulator S includes a sound absorber Sb, which is made of felt, for example, and a cover layers Sc, which is made of vinyl chloride, for example.

The large-diameter cylindrical portion 13 radially extends from the outer peripheral surface of the small-diameter cylindrical portion 12 substantially at the center in the axial direction, so as to form a tapered-shape that is gradually enlarged toward the lip portion 15. The large-diameter portion 13 and the small-diameter portion 12 are unitarily formed as one piece. The engaging groove 13a is provided in an outer peripheral surface of the large-diameter cylindrical portion 13 adjacent the end so as to engage with an inner peripheral edge of the through hole Pa. One end of the small-diameter cylindrical portion 12 is provided with extending portion 12a that extends through the interior of the large-diameter cylindrical portion 13 in the axial direction thereof, and is spaced from the large-diameter cylindrical portion 13. Another end of the small-diameter cylindrical portion 12 extends in the direction opposite to the extending portion 12a to form a fixing portion 12c, which is fixed to the wire harness W/H by using tape T.

The extending portion 12a is provided with a seal member holding portion 14 extending from the end of the extending portion 12a in the axial direction, and has a diameter that gradually enlarges to an outer end. The seal member holding portion 14 is formed so that a seal member M can be inserted therein. One end of the seal member holding portion 14 is provided with an insertion opening 14a that inclines outwardly so that the diameter thereof is gradually enlarged.

The lip portion 15 projects radially from the outer peripheral surface of the seal member holding portion 14 so as to engage with an inner peripheral surface of an insertion hole Sa of the sound insulator S from the inside. The lip portion 15 and the seal member holding portion 14 are unitarily formed as one piece. The outer peripheral end of the lip portion 15 is provided with a step portion 15a including a first pressing contact surface 15a1 that can tightly and elastically contact an inner peripheral surface of a peripheral edge of the insertion hole Sa, and a second pressing contact surface 15a2 that can elastically and tightly contact the outer surface of the sound insulator around the peripheral edge of the insertion hole Sa. Further, the lip portion 15, in a normal condition before mounting, is formed so that the length L1 from the contact surface between the engaging groove 13a of the large-diameter cylindrical portion 13 and the automobile body panel P to an inner surface of the second pressing contact surface 15a2 at the step portion 15a is set to be shorter than the thickness L2 of the sound insulator S, for example, about 4 mm. According to the above construction, when the grommet 11 is inserted into and engaged with the insertion hole Pa of the automobile body panel P, the step portion 15a of the lip portion 15 is elastically pressed in the direction of the engaging groove 13a and contacts the peripheral edge of the insertion hole Sa of the sound insulator S. Note that, the reference numeral 16 in FIG. 3(A) indicates an additional path, such as a spare path for inserting a tube, such as a windshield washer hose.

Figure 3A:
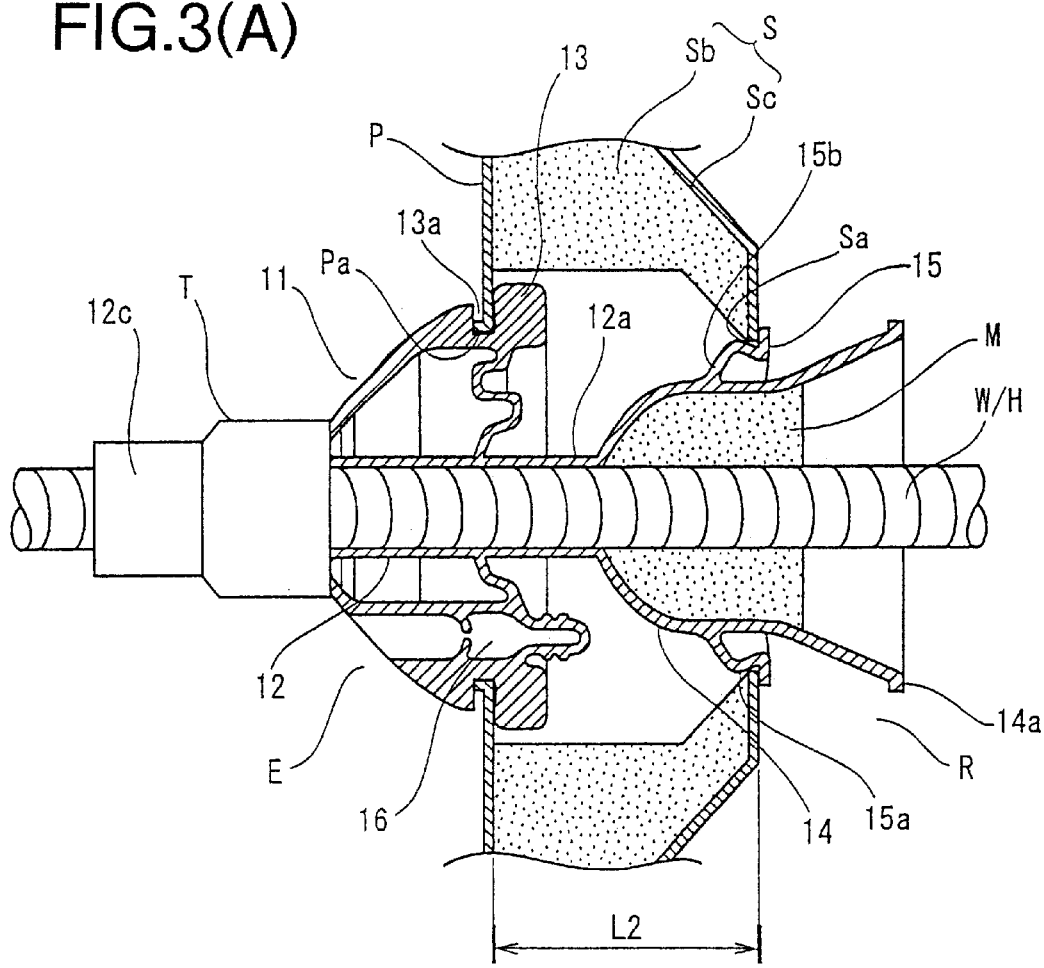
FIG. 3(A) is a cross-sectional view illustrating a condition when the grommet is mounted to an automobile body panel.

When the grommet 11 having the above construction is mounted to an automobile body panel P, in a manner similar to a usual (conventional) mounting operation, first, the diameters of the large-diameter cylindrical portion 13 and the lip portion 15 of the grommet 11 mounted around the outer periphery of the wire harness W/H are contracted, and inserted from the engine compartment side E to the passenger compartment side R. Then, by pulling the wire harness W/H toward the engine compartment side E, as shown in FIG. 3(A), the engaging groove 13a of the large-diameter cylindrical portion 13 engages with the insertion hole Pa of the automobile body panel P. At the same time, the step portion 15a of the lip portion 15 tightly contacts the inner peripheral surface of the insertion hole Sa and the outer surface around the peripheral edge of the insertion hole Sa of the sound insulator S, to engage with one another.

Figure 3B:
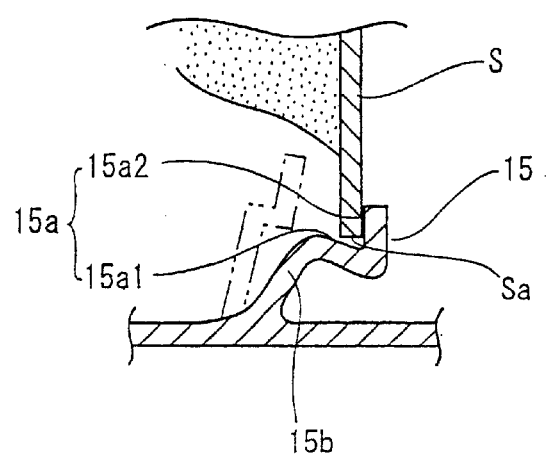
FIG. 3(B) is an enlarged partial view of a lip portion in the condition of FIG. 3(A)

When the grommet 11 is mounted, since the length L1 between the engaging groove 13a and the step portion 15a is set to be shorter than the thickness L2 of the sound insulator S, as shown in FIG. 3(B), the base portion 15b of the lip portion 15 inclines toward the right side of the drawing against the elasticity, from the position (condition) shown by the two-dot chain line. Accordingly, due to the effect of the elastic recovery force of the base portion 15b of the lip portion 15, the first pressing contact surface 15a1 and the second pressing contact surface 15a2 are elastically pressed toward the inner peripheral surface and the outer surface around the peripheral edge of the insertion hole Sa, respectively, so as to tightly contact each other.

Figure 4A:
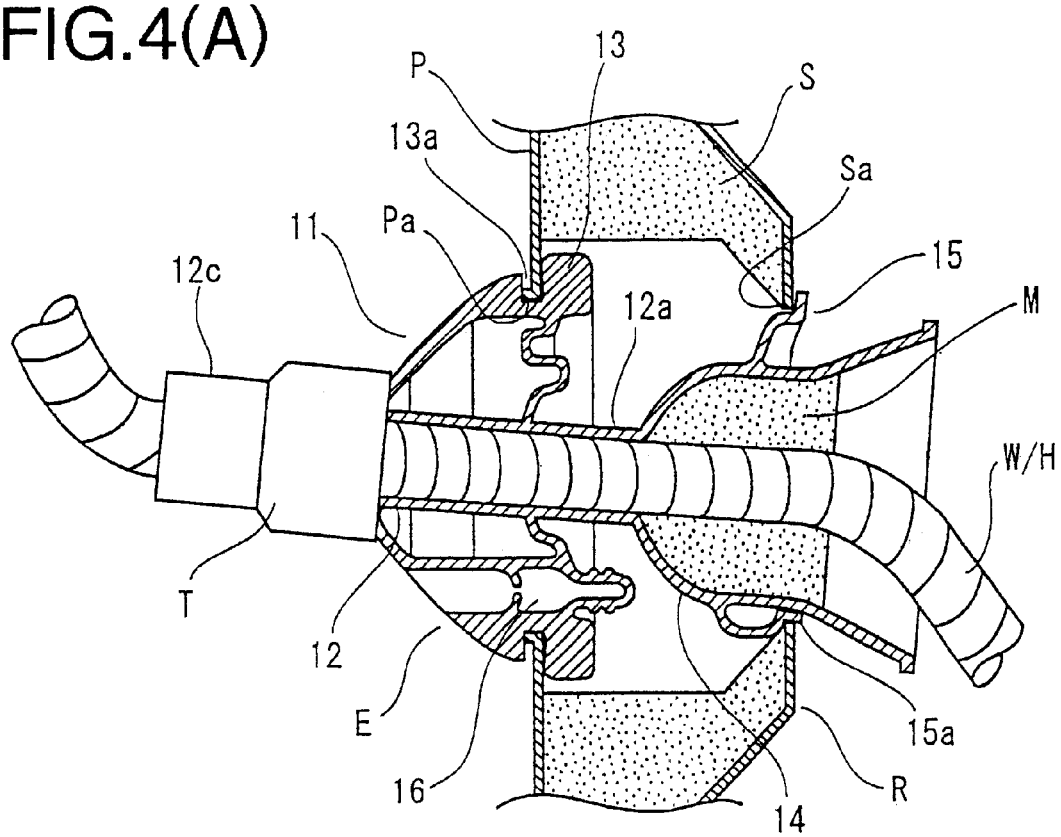
FIG. 4(A) is a cross sectional view illustrating a condition when the grommet is mounted to the automobile body panel in a condition that the wire harness inclines.
Figure 4B:
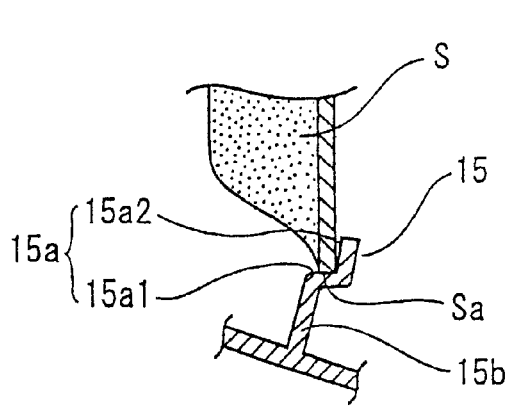
FIGS. 4(B) and 4(C) are enlarged partial views illustrating lip portions in the condition of FIG. 4(A)
Figure 4C:
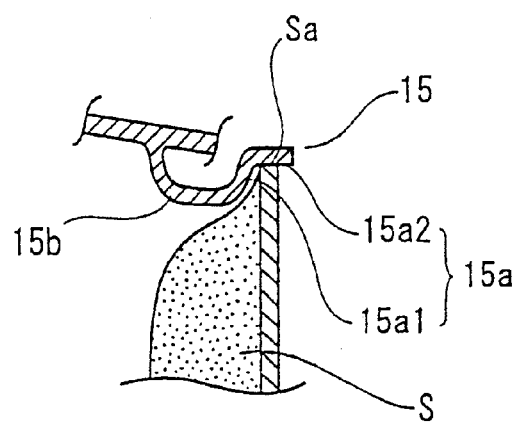
Figure 5A:
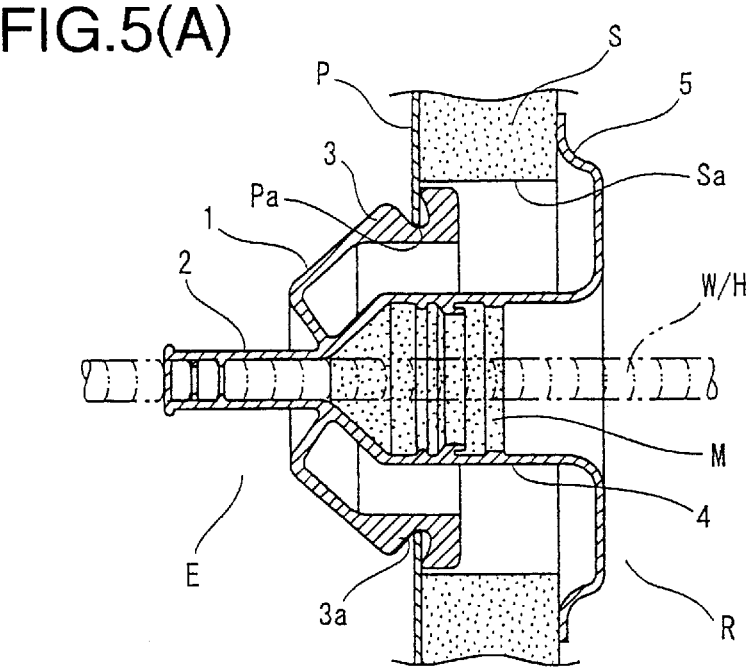
FIGS. 5(A) and 5(B) are views illustrating a conventional grommet.
Figure 5B:
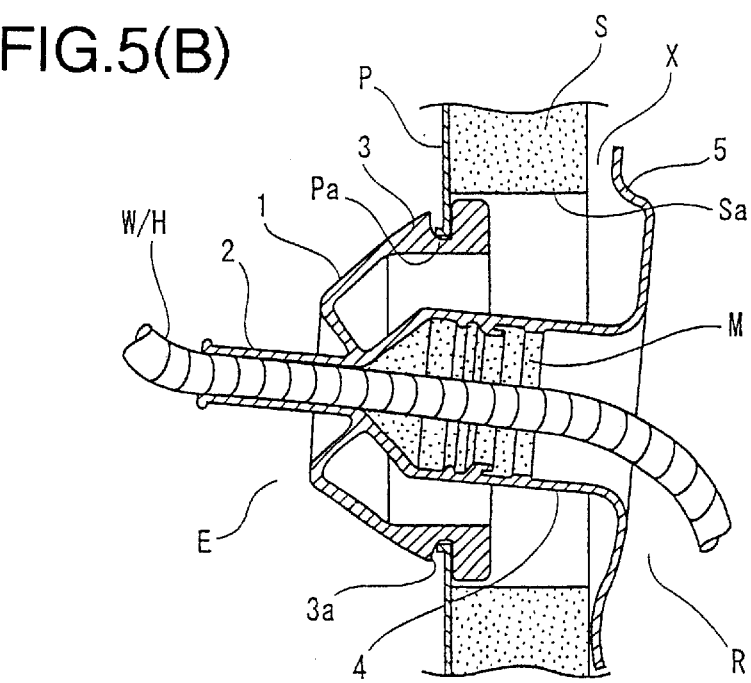

When the wire harness is mounted in a normal condition, the step portion 15a of the lip portion 15 tightly closes the insertion hole Sa, as described above. However, as shown in FIG. 4(A), when the wire harness W/H is bent in one direction and mounted with a curved portion, the following condition occurs. At the side toward which the wire harness W/H inclines, as shown in FIG. 4(C), the base portion 15b of the lip portion 15 is further bent, and as a result, the second pressing contact surface 15a2 tightly contacts the inner peripheral surface of the insertion hole Sa. On the other hand, at the opposite side, as shown in FIG. 4(B), application of the elastic force by the base portion 15b of the lip portion 15 decreases, and the second pressing contact surface 15a2 is slightly separated from the outer surface around the peripheral edge of the insertion hole Sa. However, the first pressing contact surface 15a1 maintains tight contact with the inner peripheral surface of the insertion hole Sa. Accordingly, the insertion hole Sa is closed tightly and perfectly, and thus the sound insulation is maintained.

Further, since the seal member holding portion 14 is filled with a solid seal material M, which may be any suitable sealing material, for example, a mold resilient seal or a curable liquid sealant, and when the wire harness W/H is bent, the outer peripheral surface of the seal member holding portion 14 contacts the inner peripheral surface of the insertion hole Sa via the lip portion 15. Accordingly, excessive inclination of the grommet to the extent that the step portion 15a is separated from the insertion hole Sa, is prevented.

Furthermore, in the embodiment described above, the lip portion 15 is formed to extend from the seal member holding portion 14. However, it is possible to have a construction without the seal member holding portion 14 and to form the lip portion 15 directly extending from the small-diameter cylindrical portion 12. Additionally, the base portion 15b of the lip portion 15 can extend perpendicular to, or can be inclined with respect to, the axial direction of the grommet in a normal condition (before mounting). Further, the angle between the first pressing contact surface 15a1 and the second pressing contact surface 15a2 of the step portion 15a can be a right angle, or can be set to form a positional relationship of an obtuse angle when considering the engaging condition with the insertion hole Sa.

As clearly described above, according to the grommet of the present invention, even if the wire harness is mounted to have a curved portion, and inclines to some extent in one direction with respect to the axial direction, the grommet can constantly and securely maintain a tight contact with the insertion hole by the step portion of the lip portion. Accordingly, a gap between the lip portion and the sound insulator is prevented from being formed, and thus, the noise insulating effect does not decrease.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-38640, filed on Feb. 16, 2000, which is herein expressly incorporated by reference in its entirety.

What is claimed is:

1. A grommet configured to be mounted in tight contact with a through hole in an automobile body panel and an insertion hole in a sound insulator secured on a surface of the automobile body panel, said grommet comprising:

a small-diameter portion in which a wire harness is insertable, said small-diameter portion being tightly contactable with the wire harness;

a large-diameter portion that radially extends from an outer peripheral surface of said small-diameter portion intermediate a length in an axial direction of said small-diameter portion, an outer peripheral surface of said large-diameter portion having an engaging groove that is engageable with an inner peripheral edge of the through hole;

an extending portion that extends past an end of said small-diameter portion along said axial direction; and a lip portion radially projecting from an outer peripheral surface of said extending portion, said lip portion tightly contacting an inner peripheral surface of the insertion hole in the sound insulator from inside when said grommet is mounted;

wherein said lip portion includes a step portion at a peripheral edge of said lip portion, and said step portion includes a first face and a second face that are elastically tightly engageable with the inner peripheral surface and an outer surface adjacent to a peripheral edge of the insertion hole in the sound insulator.

2. The grommet according to claim 1, wherein said extending portion includes a seal member holding portion having a diameter larger than a diameter of said small-diameter portion and being configured to receive a seal member in an interior thereof, and wherein said lip portion projects from an outer peripheral surface of said seal member holding portion.

3. The grommet according to claim 1, wherein a length between said engaging groove of said large-diameter portion and said step portion of said lip portion is shorter than a thickness of the sound insulator, and whereby, when said large-diameter portion engages with the through hole, said lip portion is pressed toward said engaging groove and elastically contacts the outer surface adjacent to the peripheral edge of the insertion hole in the sound insulator.

4. A grommet configured to be mounted in tight contact with a through hole in an automobile body panel and an insertion hole in a sound insulator secured on a surface of the automobile body panel, said grommet comprising:

a small-diameter cylindrical portion into which a wire harness is insertable, said small-diameter cylindrical portion being tightly contactable with the wire harness;

a large-diameter cylindrical portion that radially extends from an outer peripheral surface of said small-diameter cylindrical portion intermediate a length in an axial direction of said small-diameter cylindrical portion, an outer peripheral surface of said large-diameter cylindrical portion having an engaging groove that is engageable with an inner peripheral edge of the through hole;

an extending portion that extends past an end of said small-diameter cylindrical portion along said axial direction; and a lip portion radially projecting from said extending portion, said lip portion being tightly contactable with an inner peripheral surface of the insertion hole in the sound insulator from inside, wherein said lip portion includes a step portion at a peripheral edge of said lip portion, and said step portion are elastically tightly engageable with the inner peripheral surface and an outer surface adjacent to a peripheral edge of the insertion hole in the sound insulator.

5. The grommet according to claim 4, wherein said extending portion includes a seal member holding portion having a diameter larger than a diameter of said small-diameter cylindrical portion and being configured to receive a seal member in an interior thereof, and wherein said lip portion projects from an outer peripheral surface of said seal member holding portion.

6. The grommet according to claim 5, wherein a length between said engaging groove of said large-diameter cylindrical portion and said step portion of said lip portion is shorter than a thickness of the sound insulator, and whereby, when said large-diameter cylindrical portion engages with the through hole, said lip portion is pressed toward said engaging groove and elastically contacts the outer surface adjacent to the peripheral edge of the insertion hole in the sound insulator.

* * * * *